United States Patent [19]

Wakai et al.

[11] Patent Number: 4,743,096

[45] Date of Patent: May 10, 1988

[54] LIQUID CRYSTAL VIDEO DISPLAY DEVICE HAVING PULSE-WIDTH MODULATED "ON" SIGNAL FOR GRADATION DISPLAY

[75] Inventors: Yoichi Wakai; Satoru Yazawa; Hiroaki Ikejiri; Yoshiro Uchikawa; Masahide Isuda, all of Suwa, Japan

[73] Assignee: Seiko Epson Kabushiki Kaisha, Tokyo, Japan

[21] Appl. No.: 8,894

[22] Filed: Jan. 30, 1987

[30] Foreign Application Priority Data

Feb. 6, 1986 [JP] Japan .................................. 61-24338

[51] Int. Cl.$^4$ ................................................ G02F 1/13

[52] U.S. Cl. ................................................ 350/333

[58] Field of Search ........................................ 350/333

[56] References Cited

U.S. PATENT DOCUMENTS

| | | | |
|---|---|---|---|
| 4,508,429 | 4/1985 | Nagae et al. | 350/333 X |
| 4,523,811 | 6/1985 | Ota | 350/333 |
| 4,548,476 | 10/1985 | Kaneko | 350/350 S |
| 4,701,025 | 10/1987 | Endo et al. | 350/333 |
| 4,701,026 | 10/1987 | Yazaki et al. | 350/333 |

FOREIGN PATENT DOCUMENTS

| | | | |
|---|---|---|---|
| 60-46527 | 3/1985 | Japan | 350/333 |
| 1490383 | 11/1977 | United Kingdom . | |
| 2053548 | 2/1981 | United Kingdom . | |
| 2067811A | 7/1981 | United Kingdom | 350/333 |
| 2130781 | 6/1984 | United Kingdom . | |

OTHER PUBLICATIONS

Donald E. Castleberry-Varistor-Controlled Liquid--Crystal Displays—Aug., 1979—6 pages—#1123.

Seigo Togashi et al.—A 210 X 228 Matrix LCD Controlled By Double Stage Diode Rings—4 pages—#141.

David R. Baraff et al.—The Optimization of Metal-Insulator-Metal Nonlinear Devices for Use in Multiplexed Liquid Crystal Displays—4 pages—#736.

Kenji Niwa et al.—LCTV Adressed by MIM Devices—4 pages—#304.

*Primary Examiner*—Stanley D. Miller
*Assistant Examiner*—Richard F. Gallivan
*Attorney, Agent, or Firm*—Blum Kaplan Friedman Silberman & Beran

[57] ABSTRACT

The present invention provides, in an active matrix liquid crystal display device of the type including non-linear elements, for the application of an ON pulse-width modulation signal by the data line driving circuit at the rearward end of each selected period, during which the voltage corresponding to the duty-cycle of the selected signal is applied to the liquid crystal layer. The result is accurate reproduction of gray-scale images in the display under conditions of high duty-cycle driving. Further, cross-talk between columns caused by the data signal is controlled by supplying a signal voltage which eliminates the residual charges in the liquid crystal layer at the end of each selected period.

14 Claims, 8 Drawing Sheets

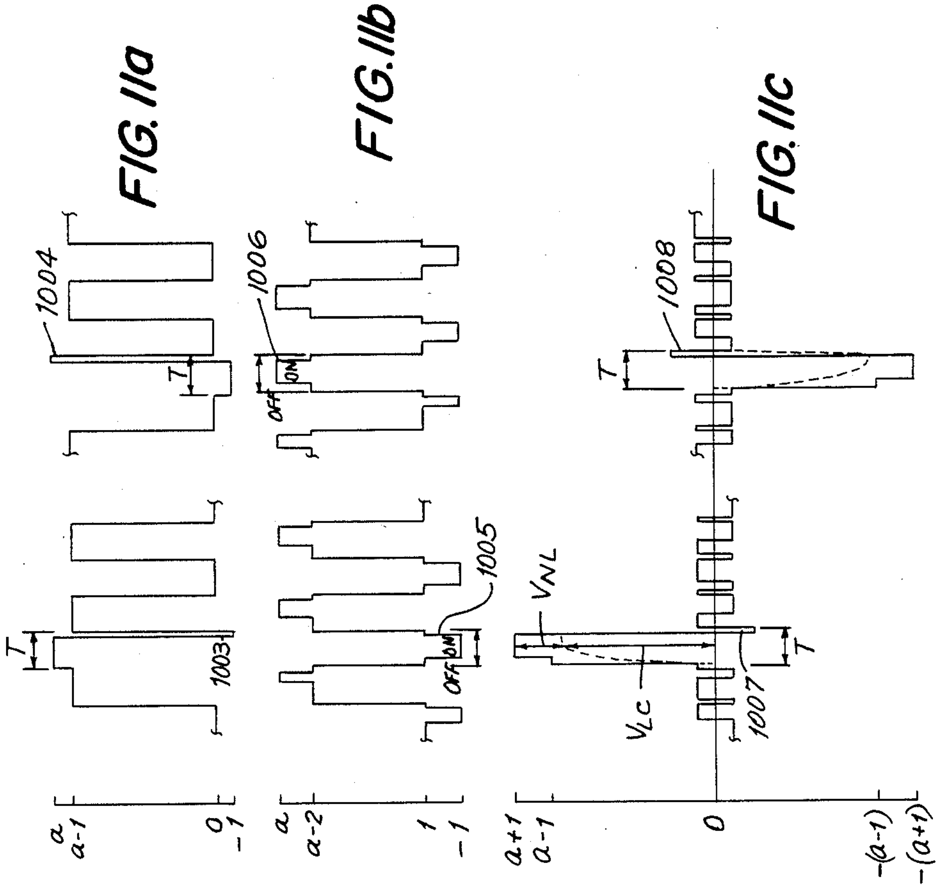
FIG. 11a
FIG. 11b
FIG. 11c
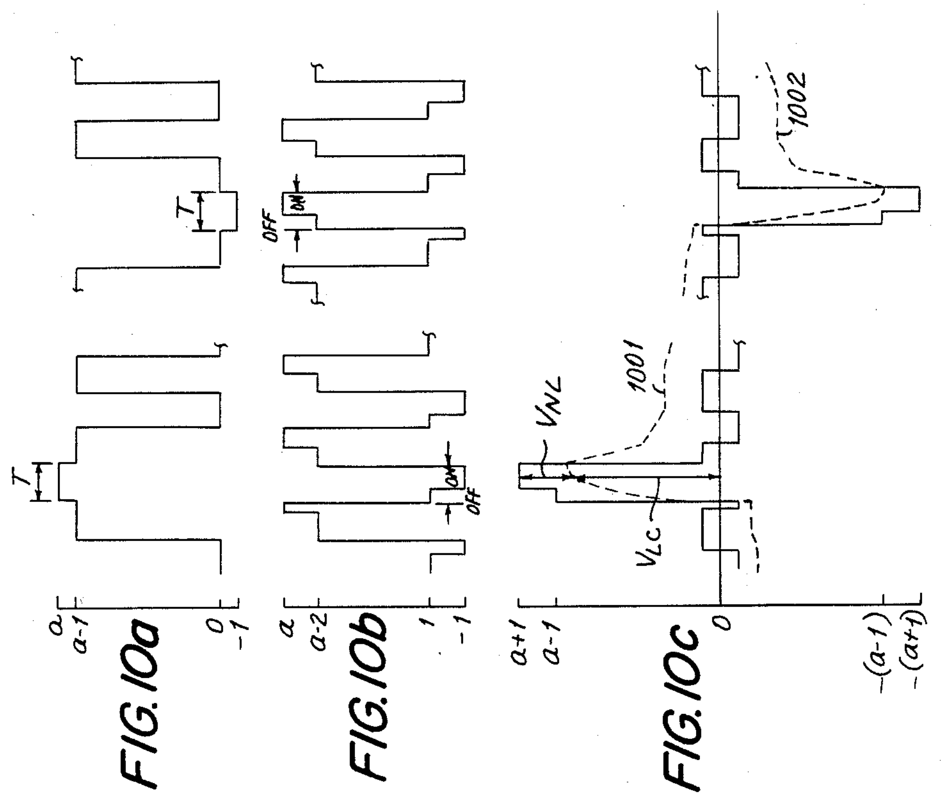
FIG. 10a
FIG. 10b
FIG. 10c

LIQUID CRYSTAL VIDEO DISPLAY DEVICE HAVING PULSE-WIDTH MODULATED "ON" SIGNAL FOR GRADATION DISPLAY

BACKGROUND OF THE INVENTION

The present invention relates to video display devices. More particularly, the invention relates to liquid crystal display devices which are capable of video displays in which each element of the display is connected in series with a non-linear element.

In known two-terminal active liquid crystal display matrices which have column electrodes on one substrate, line electrodes on the other substrate, and a layer of liquid crystal material encapsulated in the space therebetween, non-linear elements are disposed between either the liquid crystal material and the column electrodes or the liquid crystal material and the row electrodes to improve the behavior of the display when it is driven. Active matrices including such non-linear elements are described in the following publications:

1. "Varistor-Controlled Liquid-Crystal Displays", D. E. Castleberry. IEEE. ED-26, 1979, pp. 1123–1128;
2. "A 210×228 MATRIX LCD CONTROLLED BY DOUBLE STAGE DIODE RINGS", Togashi et al., Television Association Technical Report, ED 782, IPD 86-3, 1984, Japanese Laid Open Application No. 57273/84;
3. "The Optimization of Metal-Insulator-Metal Nonlinear Devices for Use in Multiplexed Liquid Crystal Displays," D. R. Baraff et al., IEEE. ED-28, 1981, from pp. 736–739; and
4. LCTV Addressed by MIM Devices K. Niwa et al., SID 84 DIGEST, 1984, pp. 304–307.

In the foregoing publications, several methods for driving active matrices are suggested. All of the driving methods utilize the switching function of non-linear elements depicted herein in FIG. 2 to control the flow of electric current to the liquid crystal display layer.

In FIG. 3, the common line driving waveform C and the data line driving waveform D of Japanese Laid Open Application No. 57273/84 are shown. These waveforms drive the common line and the data line in the same manner as that in conventional time-sharing driving, which is also known as high duty-cycle driving in liquid crystal display. The cross-hatched portion of waveform C-D shows the voltage which is applied to the liquid crystal layer. FIG. 2 shows how the threshold voltage ($V_{th}$) is the turning point in the voltage-current characteristic of the series PI diode at which the current increases sharply. Use of the diode assures that the effective voltage applied to the liquid crystal layer during non-selected periods is extremely low, whereby the ON-signal to OFF-signal ratio of the liquid crystal material is improved to obtain high contrast.

To display gray scales in the known method of driving such matrices by high duty cycle driving, the pulse width of the ON-signal in the selected period is controlled by gray-scale data, that is, the width of the pulse is modulated. An example of a conventional data-line driving circuit is shown in FIG. 4 and a chart showing timing of the voltages in the driving circuit is shown in FIG. 5, where a selected time period T corresponds to pulse widths 301 and 302 of FIG. 3. The clock frequency f and the period T are related by the equation $f=16/T$. A counter 401 (FIG. 4) counts sixteen clock signals f while outputting binary signals $Q_0$ to $Q_3$. A grayscale reference pulse-forming circuit 405 decodes the binary signals $Q_0$ to $Q_3$ and, in response thereto, generates gray scale reference pulses $P_0$ to $P_3$ (FIG. 5). When a unit width is represented as a cycle of f, gray scale reference pulses $P_0$, $P_1$, and $P_3$, respectively, stand for 1/f, 2/f, 4/f, and 8/f. Memory 402 stores digital data which has been converted from analog gray-scale data. In the known circuit, memory 402 has a capacity of four bits. The signals $M_0$–$M_3$ from memory 402 and $P_0$–$P_3$ from gray-scale reference pulse forming circuit 405 are respectively coupled to four AND gates 403′, where they are multiplied. The output of each AND gate 403′ is fed to an input of multiple-OR-gate 403, which sums the multiplied signals and as shown in FIG. 5, provides selected signals of sixteen levels of duty cycle in dependence on the data stored in memory 402. A pair of gates 404 are controlled by theoutput of gate 403 in normal or in inverted form for transmission as an ON voltage, $V_{ON}$, or an OFF voltage, $V_{OFF}$, to a row electrode as a data line driving signal. However, when an active-matrix liquid crystal display having non-linear elements is driven by the known high duty-cycle method described above, problems still remain.

FIG. 6 is a symbolic representation of the structure of a picture element in an active-matrix liquid crystal display which has non-linear elements, depicting a non-linear element 603 and a layer of liquid crystal material 604 as connected in series at the intersection of a row electrode 601 and a column electrode 602. The voltages which appear across non-linear element 603 and liquid crystal layer 604 are hereinafter referred to as $V_{NL}$ to $V_{LC}$, respectively. When a data line driving signal from the driving circuit of FIG. 4 is applied to such an element via row electrode 601 and column electrode 602, the voltage which appears across two-terminal non-linear element 603 and liquid crystal layer 604 is shown in FIG. 7. In this example, the gray scale data signal ($M_0$, $M_1$, $M_2$, $M_3$) is (0, 1, 0, 1). As a result of the non-linear characteristic (FIG. 2) of the non-linear element, the liquid crystal layer is charged by a large flow of current during the periods $t_0$ and $t_1$. Since $V_{NL}$ is large, $V_{LC}$ increases rapidly. However, during OFF period $t_2$, even though $V_{NL}$ is reduced, the liquid crystal layer is not discharged, since $V_{NL}$ remains less than $V_{th}$. Accordingly, $V_{LC}$ remains substantially level. In period $t_3$, $V_{NL}$ is again increased and $V_{LC}$ increases, stopping at the level where $V_{NL}$ is equal to $V_{th}$. This driving method, however, does not permit the display of gray scale values using pulse-width modulation in which, for example, $t_0$="0", $t_1$"1", $t_2$="0" and $t_3$="1" due to the charge holding action of the non-linear element, because $V_{LC}$ is not reduced in the period $t_2$.

It is, therefore, difficult to display gray scale in an active matrix display having non-linear elements which are driven with high duty cycles by the known method described above. There is a need, therefore, for a simple method and a circuit embodying the method for driving an active matrix non-linear element which enables the display of gray scale values.

SUMMARY OF THE INVENTION

The present invention solves the above problem in an improved liquid crystal video display having two substrates which respectively carry column electrodes and row electrodes, a layer of liquid crystal material therebetween and contacting the electrodes, and a plurality of non-linear elements on one of the substrates. Each non-linear element is located at a crossing of a column electrode and a row electrode and, together with a portion of the liquid crystal, provides a display-forming element. According to the invention, the elements are driven by pulse-width modulated signals which are generated by a data line driving circuit in which the ON pulses are transmitted continuously at the latter end of each selected period. According to another aspect of the invention, a signal for discharging the charge stored in the liquid crystal layer is subsequently applied between a row electrode and a column electrode. As a result, the circuit structure of the invention provides for effective display of gray scale images in a liquid crystal display.

In the circuit of the invention, a common line driving circuit generates voltage which is selectively applied to the column electrodes so that, in a selected period, the effective voltage between the row electrodes and the column electrodes is large, and in a non-selected period, the effective voltage is small. Also, a data line driving circuit is provided which generates a pulse-width modulation signalf or displaying gray scale which is applied selectively to the row electrodes. In the pulse-width modulation signal, the ON pulses, which turn the liquid crystal on, are all transmitted together, e.g. continuously, in the latter portion of the selected period, following the OFF pulses, which turn the liquid crystal off.

Further, at the end of each selected period, an additional signal is applied between the row electrode and the column electrode to discharge the electric charge which was stored in the liquid crystal layer during the selected period. The polarity of the voltage of the discharge signal is opposite to that applied between the row electrode and the column electrode during the selected period and cross-talk between adjacent display columns is eliminated.

Since, by means of the foregoing circuit, the ON pulses of the pulse-width modulation signal from the data line driving circuit appear together as one pulse in the latter portion of each selected period, the length of the voltage pulse which is applied to the liquid crystal layer corresponds to the duty cycle of the selected signal. Thus, display of gray-scale values can be fully attained in an active-matrix liquid crystal display having non-linear elements which is driven in high duty cycles. In addition, by providing a signal for discharging the electric charge stored in the liquid crystal layer at the end of each selected period, the level of data signal cross-talk between columns is controlled.

It is an object of the present invention to enable the effective display of gray-scale in active liquid crystal displays in which the matrix includes non-linear elements.

It is still another object of the present invention to eliminate cross-talk between adjacent columns in an active-matrix, liquid crystal display having non-linear elements.

Still other object and advantages of the invention will in part be obvious and will in part be apparent from the specification.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 10*a,* 10*b* and 10*c* are a first set of waveforms in which the ON pulses which drive the liquid crystal display are gathered at the end of the selected period in the present invention; and FIGS. 11*a,* 11*b* and 11*c* are a second set of waveforms driving the liquid crystal display of the present invention in which pulses of voltage of opposite polarity are applied at the end of each selected period.

DETAILED DESCRIPTION OF THE INVENTION

Figure 1:
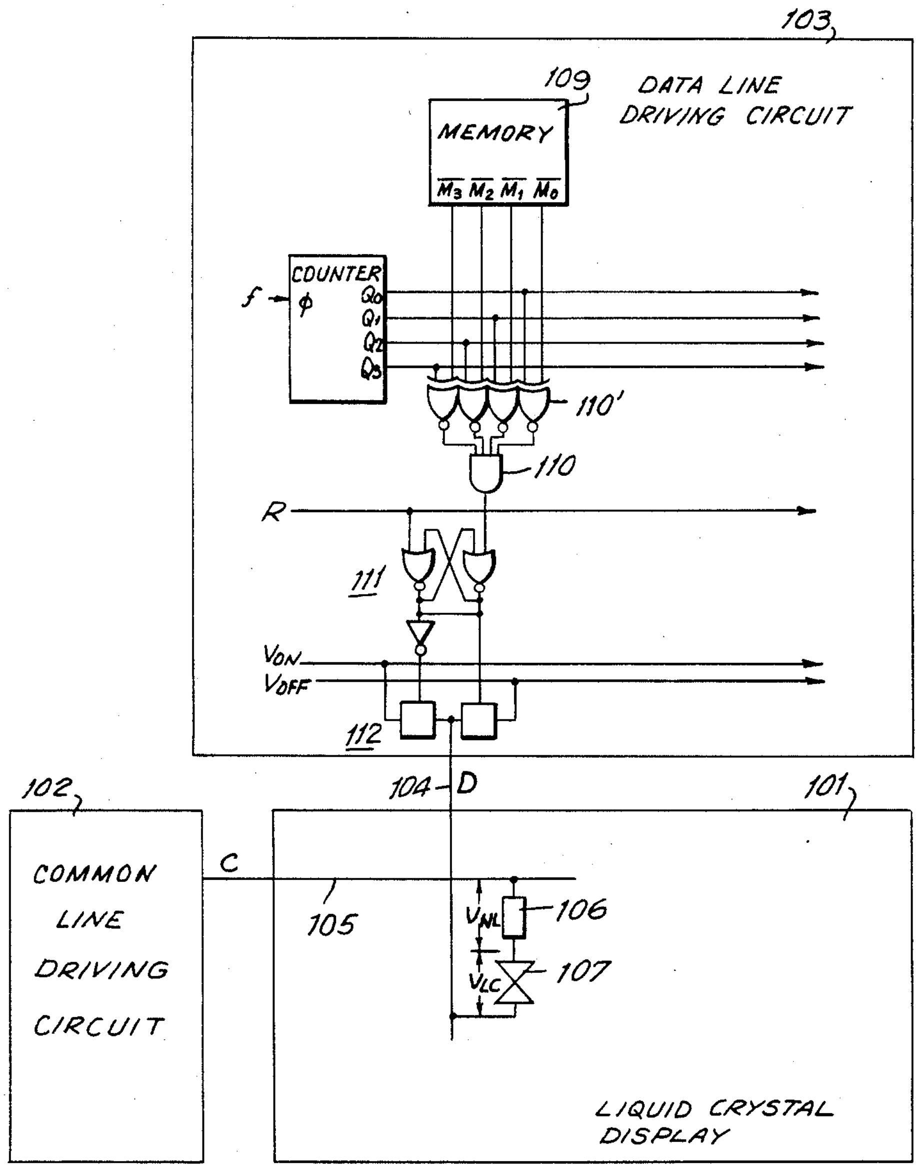
FIG. 1 is a block diagram of a liquid crystal video display and drive, in accordance with the present invention.
Figure 2:
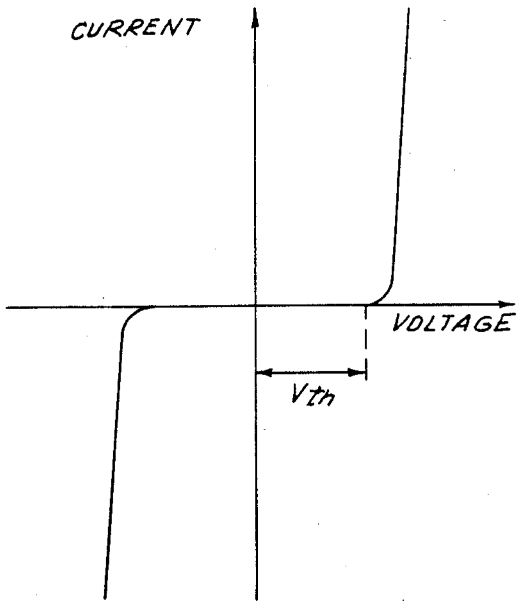
FIG. 2 shows the characteristic curve of a non-linear element used in the present invention.
Figure 3:
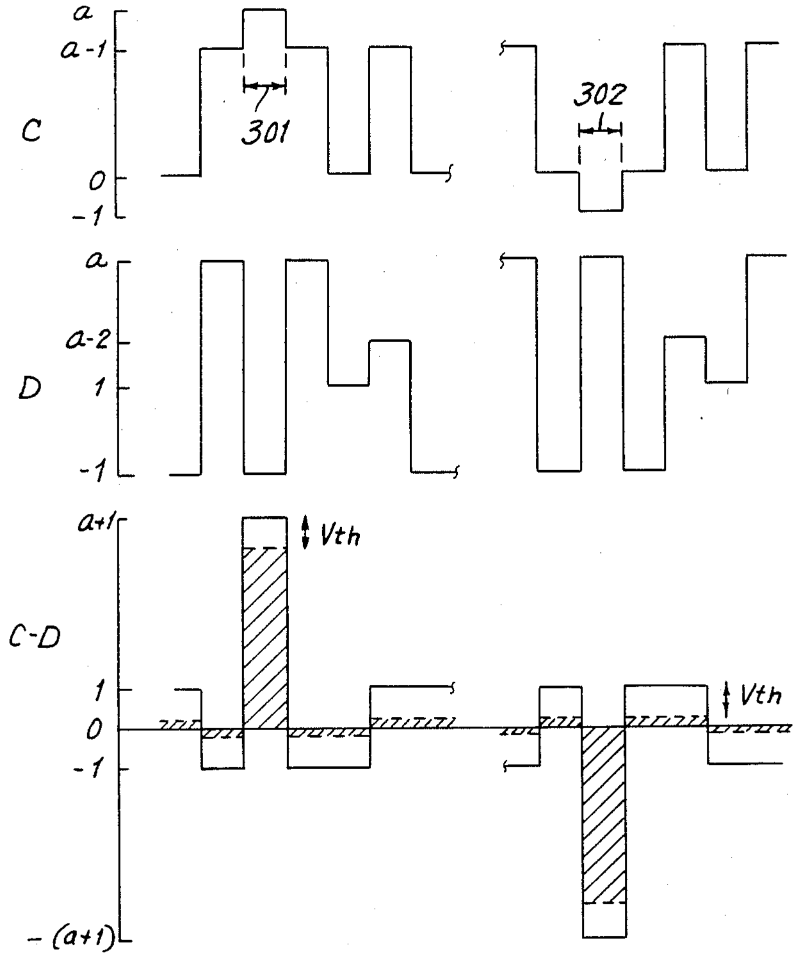
FIG. 3 shows the waveform used for driving a known liquid crystal display having non-linear elements.

An illustrative embodiment of a circuit according to the present invention is shown in FIG. 1, where the elements of an active matrix for generating a video picture element in a liquid crystal display 101 are schematically represented. Each picture element, of a plurality of like picture elements, is formed by a portion of liquid crystal layer 107 which is electrically connected in series with a non-linear element 106 and which, for simplicity, is shown as located between a column electrode 105 and a row electrode 104 of the display. Only one such crossed pair of electrodes is shown, although many are required to form an image.

As shown in FIG. 10, a common line driving circuit 102 transmits a line driving signal on column connecting line C to column electrode 105 so that a large effective voltage is applied to the liquid crystal layer during a given selected period. During a non-selected period, a small effective voltage is applied to the liquid crystal layer. A data line driving circuit 103 outputs a data line driving signal to row electrode 104 on row connecting line D. The data line driving signal is a pulse-width modulated signal in which the ON pulse or pulses are generated at the end of the selected period appearing as one continuous pulse, as shown in FIG. 10.

Figure 4:
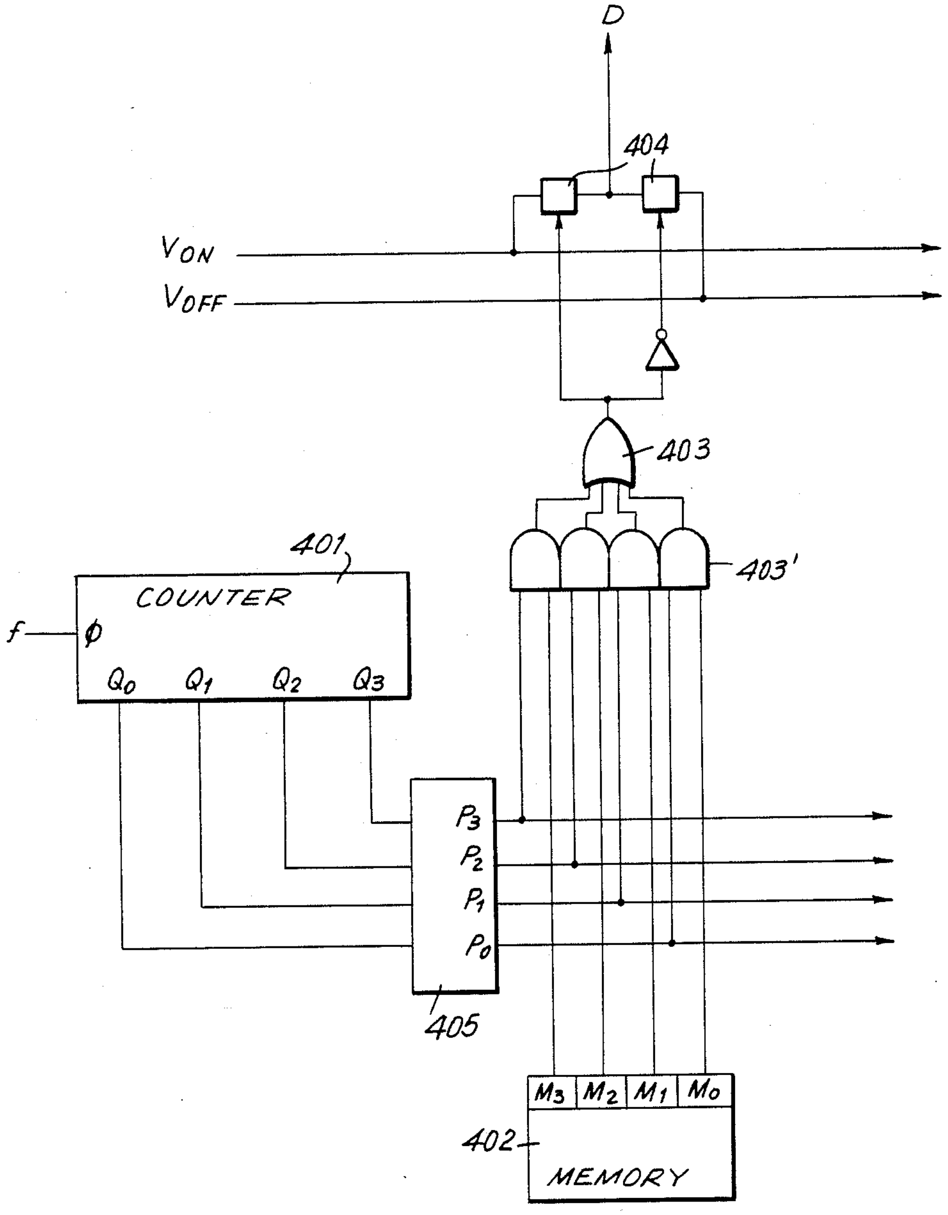
FIG. 4 is a schematic diagram of a known data line driving circuit.
Figure 5:
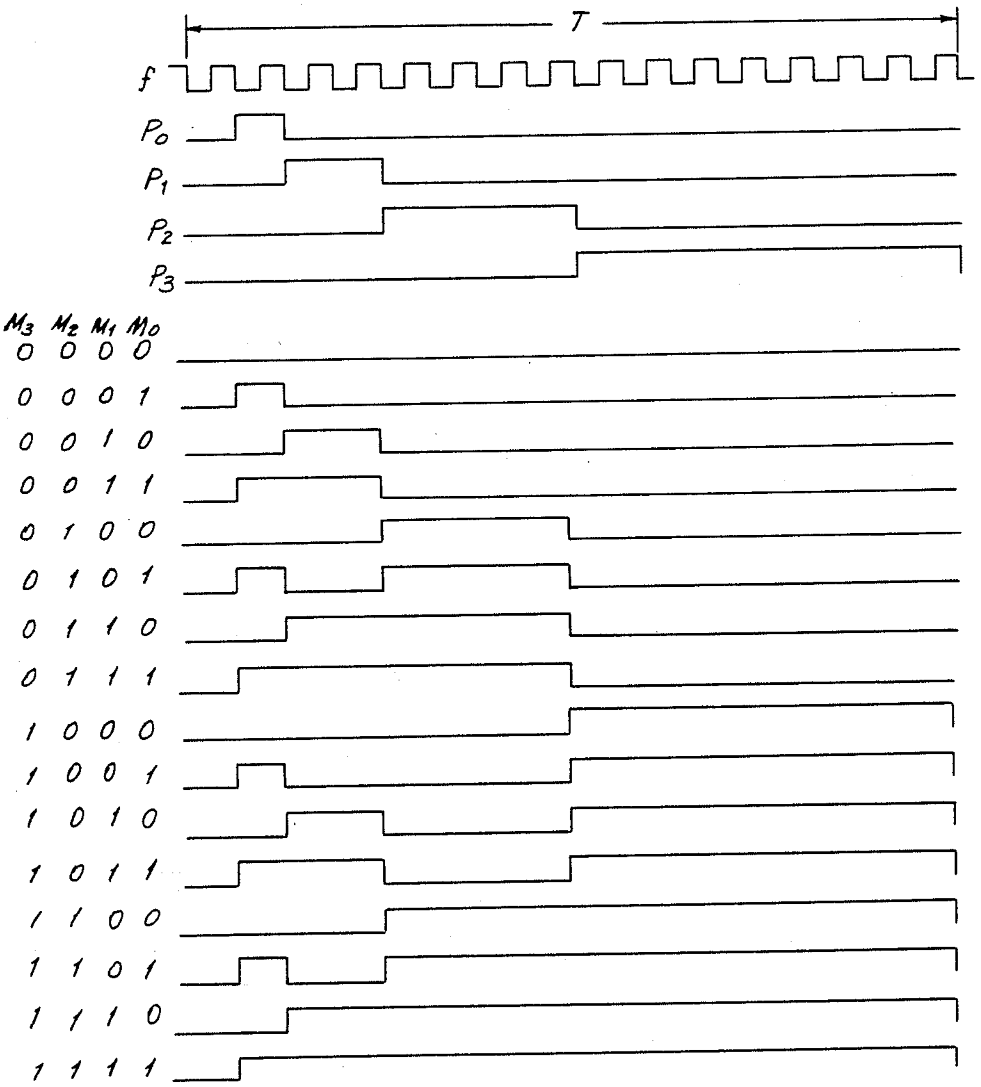
FIG. 5 is a timing chart showing waveforms at selected points in the circuit of FIG. 4.
Figure 6:
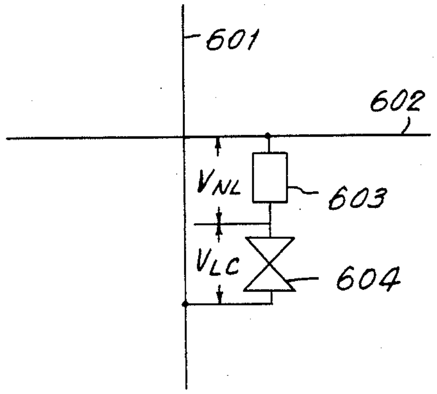
FIG. 6 is a block diagram of a picutre element in the display.
Figure 7:
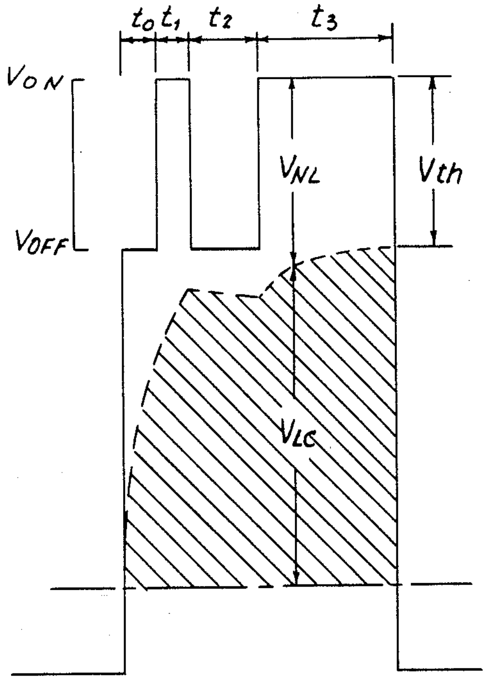
FIG. 7 is the waveform used for driving the known liquid crystal display.
Figure 8:
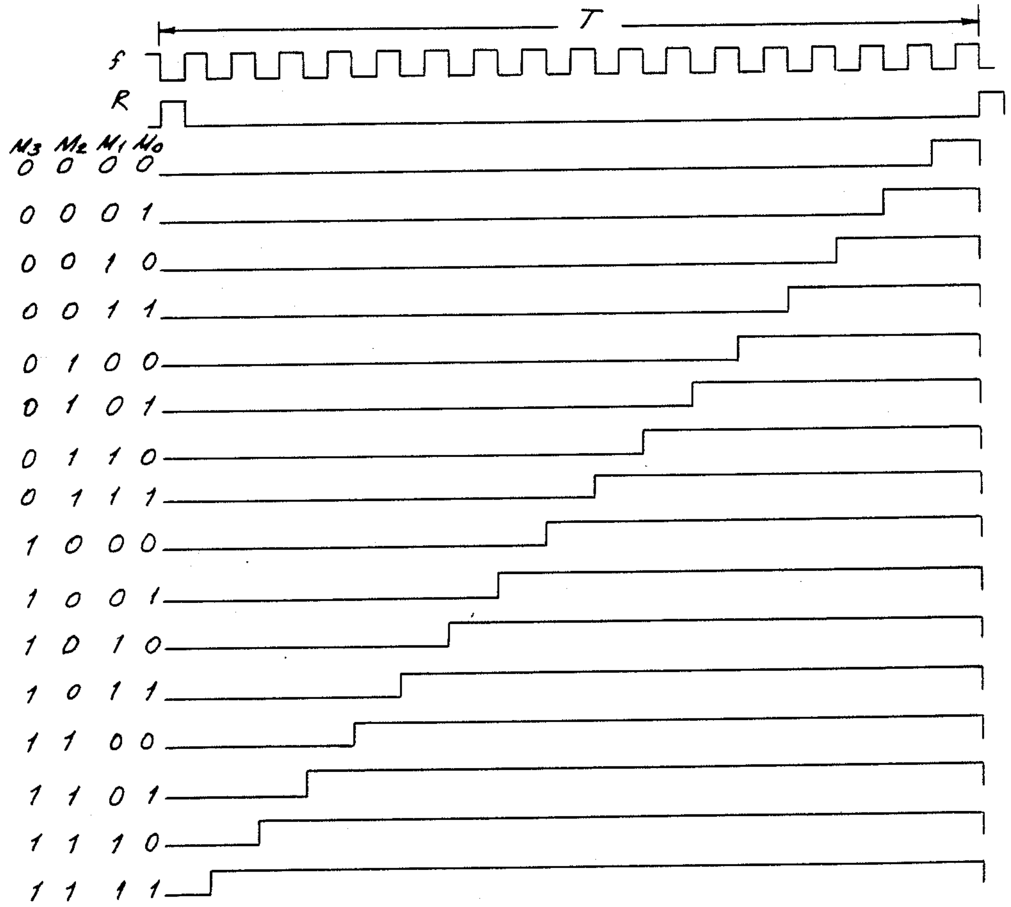
FIG. 8 is a chart showing the data line waveforms produced by the driving circuit of the present invention.

Data line driving dircuit 103 includes a counter 108 which functions in the same way as counter 401 of FIG. 4. A memory 109 in driving circuit 103 stores gray scale data and functions in the same way as memory 402 of FIG. 4. Four exclusive —NOR (EX—NOR) gates 110' detect the coincidence of output signals $Q_0$, $Q_1$, $Q_2$, and $Q_3$ from counter 108 with output signals $M_0$, $M_1$, $M_2$, and $M_3$ from memory 109, respectively, and multiple AND gate 110 receives and multiplies the outputs of the gates. Specifically, AND gate 110 detects the coincidence of complement data from counter 108 and memory 109 and provides an output signal which is fed to and sets an RS latch 111. RS latch 111 is reset by a signal on line R which, as shown in FIG. 8, has a period that is equal to the selected period T. Thus, a pulse-width modulated signal is generated in accordance with code which is stored in memory 109. The output signal from RS latch 111 is fed to one side of a transmission gate 112 and the inverted ouput signal is fed to the other side. The transmission gate selects one of an ON voltage ($V_{ON}$) or an OFF voltage ($V_{OFF}$) for transmission on row line 104 to the row electrode and the display element.

Figure 9A:
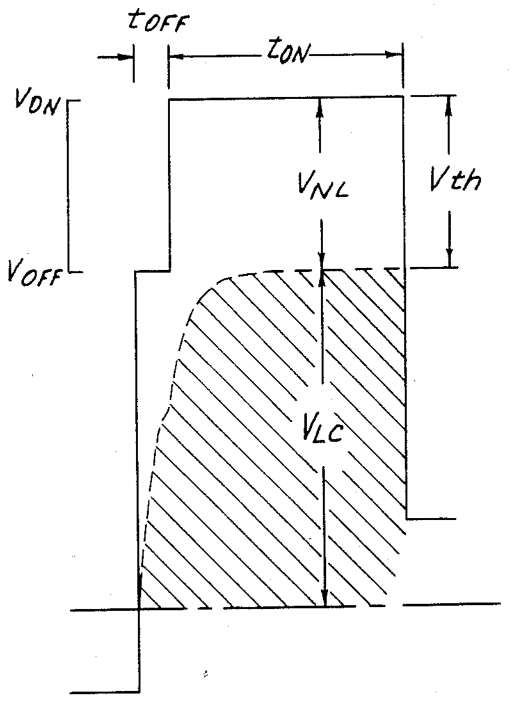
FIGS. 9*a* and 9*b* are charts showing waveforms for driving the liquid crystal display of the present invention.
Figure 9B:
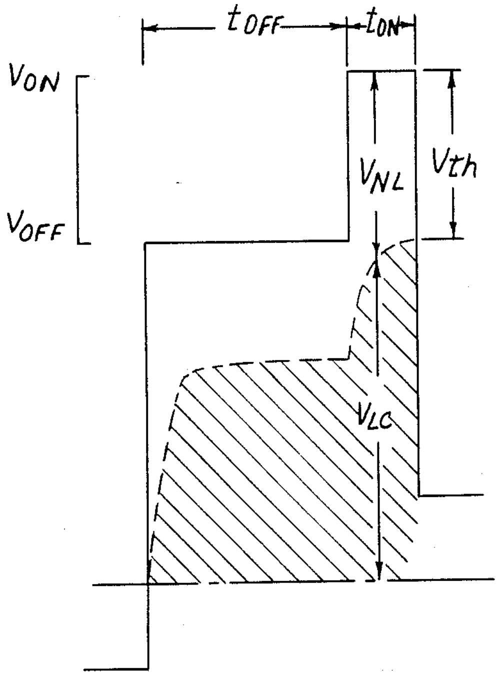

FIGS. 9*a* and 9*b* show representative waveforms of the voltage which appears across liquid crystal layer 107, e.g. the voltage applied to row electrode 104 and column electrode 105 when the data line is driven by data line driving circuit 103. FIG. 9*a* shows the waveform when $M_0$, $M_1$, $M_2$, and $M_3$ are 0, 1, 1 and 1, respectively, whereas FIG. 9*b* shows the waveform when $M_0$, $M_1$, $M_2$, and $M_3$ are 1, 1, 0, and 0, respectively. In the both cases, $V_{LC}$ corresponds to the voltage applied to the liquid crystal layer during a pulse-width modulated signal.

FIGS. 10 and 11 illustrative waveforms used for driving the liquid crystal element; in these figures, an extended time axis is used to show several successive pulses. As depicted in FIG. 10, the ON pulses which form the gray scale picture element are all transmitted at the latter end of the selected period as a continuous signal. The signals of FIGS. 10*a* and 10*b* are respectively applied to the column electrode and the row electrode and form the differential voltage thereacross which is shown in FIG. 10*c*. In a selected period, as has been shown in FIG. 9, the voltage $V_{LC}$ is applied to the liquid crystal layer during the pulse-width modulation signal. However, during a succeeding non-selectetd period, the voltage $V_{NL}$ is very high and the polarity thereof is opposite to that of the selected period because the liquid crystal layer has become electrically charged during the selected period. As a result, as shown in FIG. 10*c* by curves 1001 and 1002 (dashed lines), the voltage level of the succeeding data line is, in effect, modulated by the driving voltage of the preceding data line. The modulated wave, thus, causes the above cross-talk defect between columns in the display.

The driving signals of FIGS. 11*a* and 11*b* have been modified to include a voltage coponent which overcomes this defect. In the signal of FIG. 11*a*, reverse pulses 1003 and 1004 are added at the rear end of the selected periods T. Pulses 1003 and 1004 have polarities which are opposite to the polarities of the voltage applied during the selected period. Further, as shown in FIG. 11*b*, a pulse of OFF voltage level can be added to the rear end of each selected period T to produce pulses 1007 and 1008. When added to the differential voltage (FIG. 11*c*) at the rear end of each selected period T, pulses 1007 and 1008 remove electrical charge which had been accumulated in the liquid crystal layer during the selected period. Preferably, $V_{NL}$ is lower than $V_{th}$, i.e. $V_{NL} < Vth$. Thus, when $V_{NL}$ is low in the succeeding selected period, the cross-talk caused by the presence of data line driving voltage in the preceding column is prevented: compare FIGS. 10*c* and 11*c*. To form the signal of FIG. 11*b*, the pulse of reset signal R is widened toward the forward end of period T as shown in FIGS. 1 and 8, and a pulse of OFF level is provided at the end of the selected period T.

As set forth above, the present invention provides, in an active matrix liquid crystal display device of the type including non-linear elements, for the application of an ON pulse-width modulation signal by the data line driving circuit at the rearward end of each selected period, during which the voltage corresponding to the duty-cycle of the selected signal is applied to the liquid crystal layer. The result is accurate reproduction of gray-scale images in the display under conditions of high duty-cycle driving.

Further, cross-talk between columns caused by the data signal is controlled by supplying a signal voltage which eliminates the residual charge in the liquid crystal layer at the end of each selected period.

The above-mentioned driving methods are applicable to the several active matrices described in the above-mentioned references.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

What is claimed is:

1. A video liquid crystal display device comprising, a liquid crystal display including a plurality of column electrodes on a first substrate, a plurality of row electrodes on a second substrate, a liquid crystal material disposed between the substrates, the column electrodes and the row electrodes crossing each other at substantially right angles and in contact with the liquid crystal material, and a plurality of non-linear elements coupled between the electrodes and the liquid crystal material, there being a non-linear element connected to one of the electrodes at each crossing in the active area of the display;

common line driving means coupled to a column electrode for maintaining a voltage between a row electrode and a column electrode at a high level during a selected period and at a low level during a non-selected period; and data line driving means coupled to a row electrode for providing a pulse-width modulated signal to display a visual element in gray scale, the driving circuit providing an ON pulse which is continuously generated at the rearward portion of the selected period.

2. The display device of claim 1 wherein the forward portion of the selected period comprises a continuous OFF pulse.

3. The display device of claim 1 wherein the duration of the ON pulse substantially corresponds to the duration of the pulse-width-modulated signal.

4. The display device of claim 1 wherein the non-linear elements are PIN diodes.

5. The display device of claim 4 wherein the liquid crystal material has a threshold voltage and the voltage which appears across the non-linear element is less than the threshold voltage.

6. The display device of claim 1, and further comprising:

means for applying a discharge voltage between beoth the row electrode and the column electrode at the end of each selected period for removing charge stored in the liquid crystal material during the selected period, the discharge voltage having a polarity opposite to that of the voltage applied to the row electrode and the column electrode in the selected period.

7. The display device of claim 1 wherein the data line driving means further comprises:

counter means for counting clock signals to provide a predetermined number of binary signals;

memory means for storing and providing gray scale data ouput signals;

detector means having the binary signals from the counter means and the gray scale data ouput signals from the memory means as inputs, the detector means providing at least one output when there is complementary occurrence of the input signals; and means responsive to the ouput of the detector means to provide the pulse-width modulation signal.

8. The display device of claim 7 wherein the detector means comprises at least one exclusive-or means.

9. The display device of claim 8 wherein the exclusive-or means comprises a plurality of small exclusive-or gates.

10. The display device of claim 9 wherein the means for response to the ouput of the detector means comprises an AND gate.

11. The display device of claim 10 wherein the AND gate has an output, and further comprising:

latch means having the output of the AND gate and a reset signal as inputs; and having the pulse-width modulated signal as an ouput.

12. The method of driving a liquid crystal display device having a plurality of column electrodes on a first substrate, a plurality of row electrodes on a second substrate, the column electrodes and the row electrodes crossing each other at substantially right angles and being in contact with the liquid crystal material, and a plurality of non-linear elements between the electrodes and the liquid crystal material, there being a non-linear element connected to one of the electrodes at each crossing in the active area of the display, the method comprising the steps of:

maintaining the voltage between a column electrode and a row electrode at a high level during a selected period and at a low level during a non-selected period; and providing a pulse-width modulated signal to a row electrode for displaying a visual element in gray scale, the signal comprising a continuous ON pulse at the rearward portion of the selected period.

13. The method of claim 12 and comprising the further step of:

providing a continuous OFF pulse as the forward portion of the selected period.

14. The method of claim 12 and comprising the further step of:

at the end of each selected period, applying a discharge voltage of polarity opposite to that of the voltage applied between the column electrode and the row electrode to remove charge stored in the liquid crystal material in the selected period.

* * * * *